Feb. 3, 1970  W. BEIG ET AL  3,493,069
DUAL CONTROL SYSTEM
Filed Sept. 18, 1967  11 Sheets-Sheet 1

Willy Beig
Willy Kühnle
Inventors by *[signature]*
Attorney

Willy Beig
Willy Kühnle
Inventors

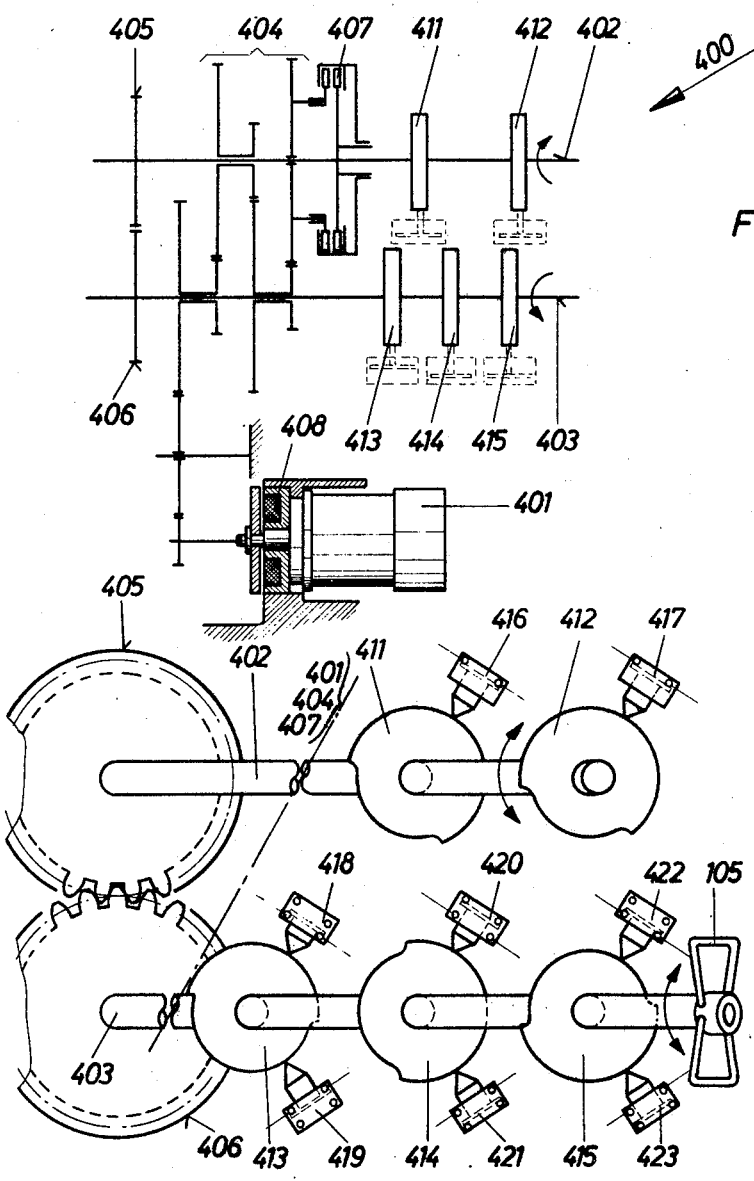

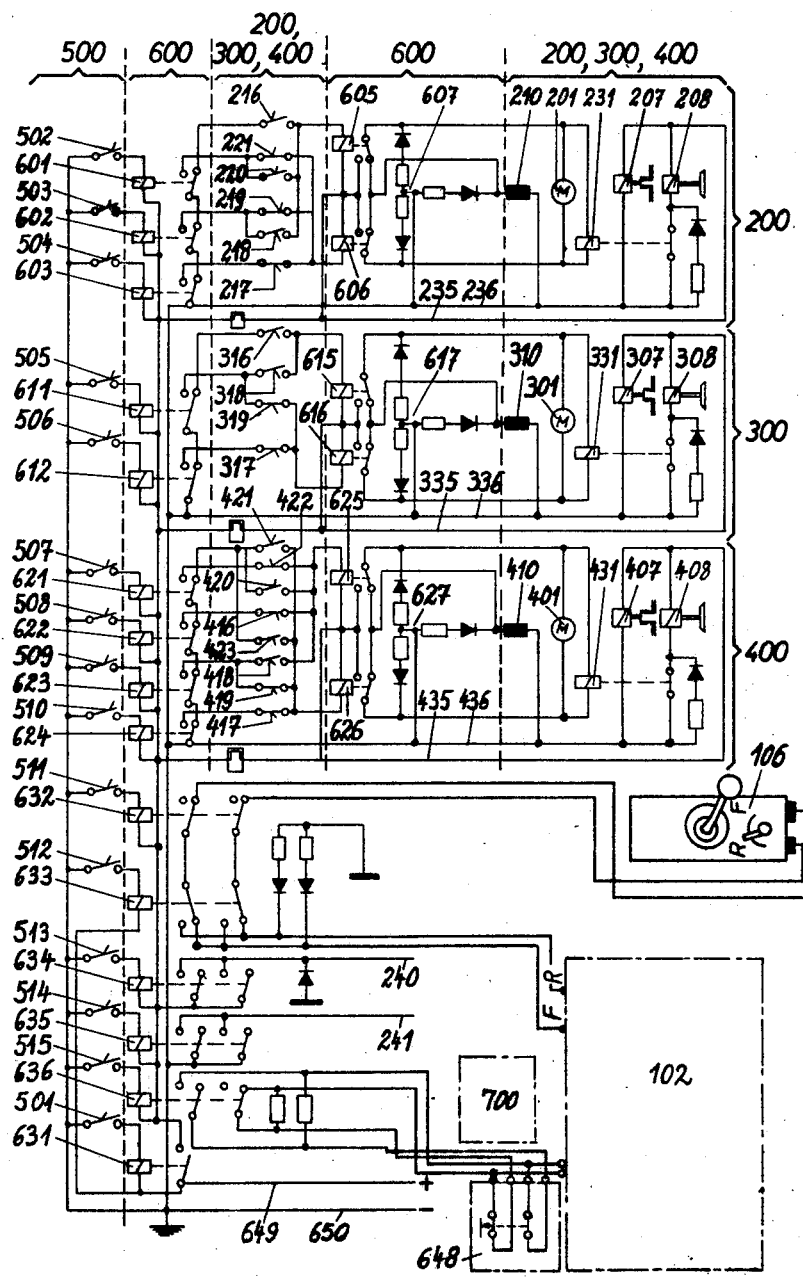

Willy Beig
Willy Kühnle
Inventors by
Attorney

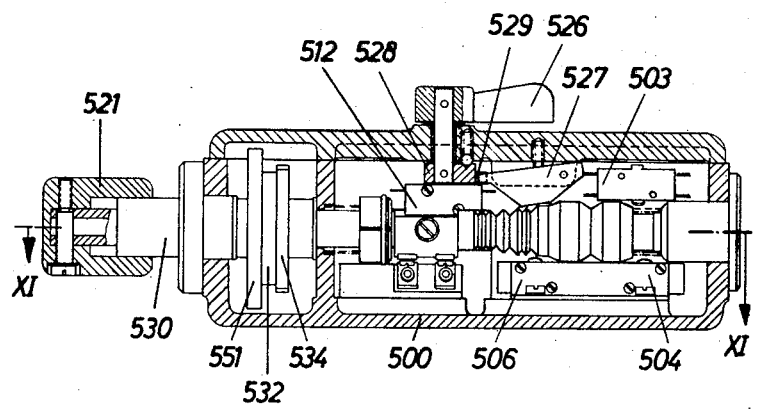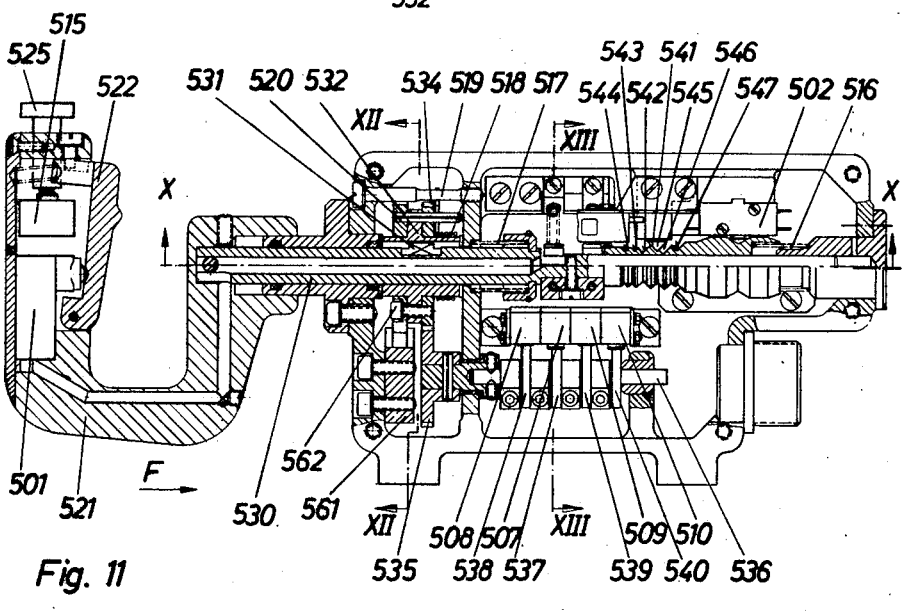

Feb. 3, 1970 W. BEIG ET AL 3,493,069
DUAL CONTROL SYSTEM
Filed Sept. 18, 1967 11 Sheets-Sheet 8

Willy Beig
Willy Kühnle
*Inventors*

Inventors
Willy Beig
Willy Kühnle
by Attorney

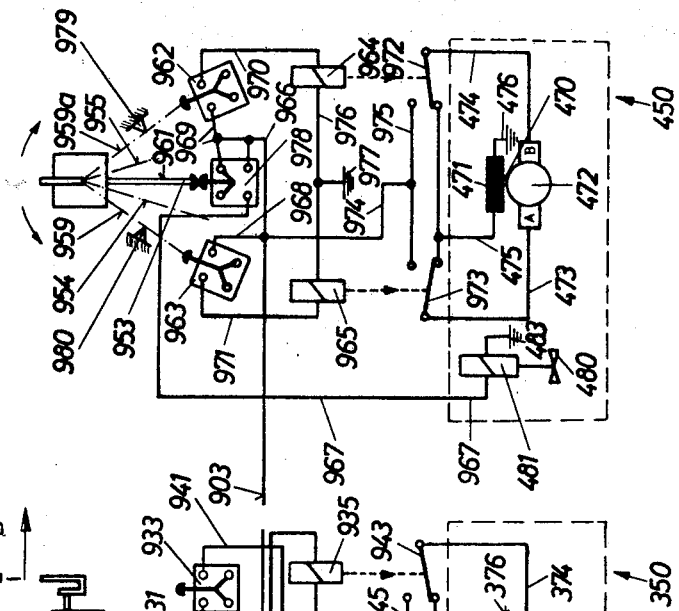
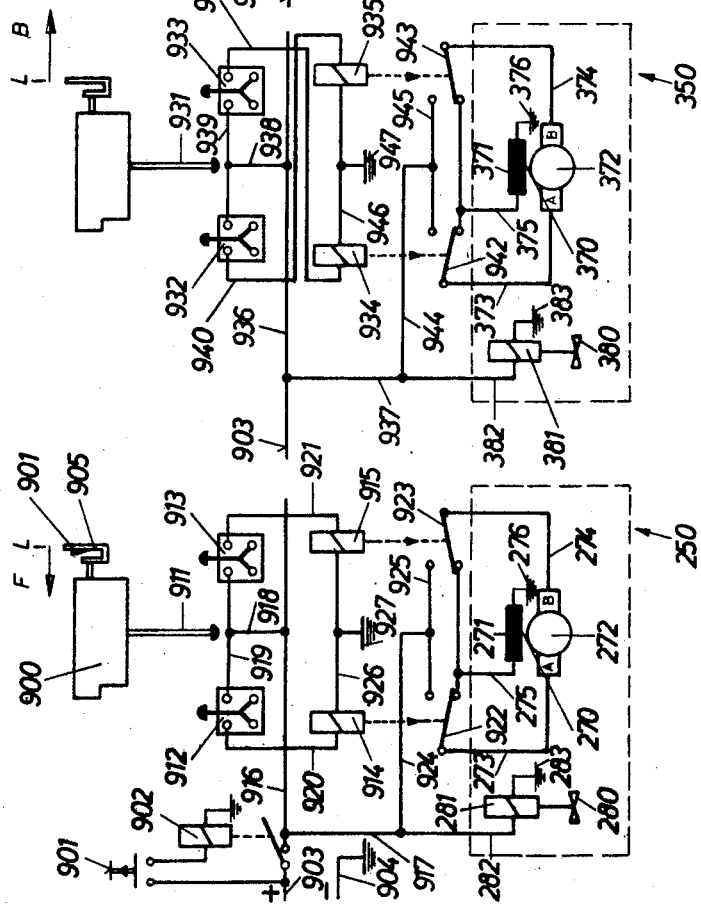

United States Patent Office 3,493,069
Patented Feb. 3, 1970

3,493,069
DUAL CONTROL SYSTEM
Willy Beig, Friedrichshafen-Waggershausen, and Willy Kühnle, Friedrichshafen, Germany, assignors to Zahnradfabrik Friedrichshafen Aktiengesellschaft, a corporation of Germany
Filed Sept. 18, 1967, Ser. No. 668,567
Claims priority, application Germany, Sept. 17, 1966, Z 12,427
Int. Cl. B60k 29/00
U.S. Cl. 180—77
27 Claims

ABSTRACT OF THE DISCLOSURE

The invention relates to vehicles having a mechanical control arrangement for use of the vehicle driver and an overriding arrangement whereby a control operator in the vehicle can disable the driver's controls and take over maneuvering of the vehicle. Thus a control operator, for example in a military tank, a tank commander, can assume control of throttle, brakes and steering at will. The arrangement is usable for all manner of vehicles and is particularly adapted for radio control.

In essense, the invention, as shown in two modifications, relies on auxiliary power which may be either by electric or hydraulic motors for the purpose of operating the vehicle throttle, brakes or steering wheel, by a control operator. In one modification using electric motors, the control or command functions are effected in steps. Thus for throttle control the steps of one-third throttle opening, one-half throttle opening and full throttle opening are provided for by selection of the control operator. In a second modification, utilizing hydraulic power for operating the throttle, brakes and steering, any intermediate position in the course of opening or closing the throttle or engaging or releasing the brakes or manipulating the steering wheel can be selected by the control operator. Accordingly, the hydraulic power means permits infinite variation of control for the three functions..

IN THE DRAWING

FIG. 6 is an equivalent arrangement to FIG 2 for operator control of vehicle steering;

FIG. 7 is an equivalent control to FIG. 3 for operator control of vehicle steering;

FIG. 8 shows the control circuitry whereby the electric motors shown in FIGS. 2, 4 and 6 are controlled by a control operator, it being understood that such circuitry is generally of conventional nature; various other control functions and the circuitry therefor are also illustrated in FIG. 8;

FIG. 10 is a plan view through X—X of FIG. 11 partially in section taken through the control housing and illustrating various mechanical and electrical components to which the circuitry of FIG. 8 is responsive;

FIG. 11 is a section in elevation through XI—XI of FIG. 10;

FIG. 17a shows a schematic electrical diagram of the circuitry for throttle control.

FIG. 17b shows the electrical circuitry for vehicle brake control and

FIG. 17c shows the electrical circuitry for steering control.

Figure 1:
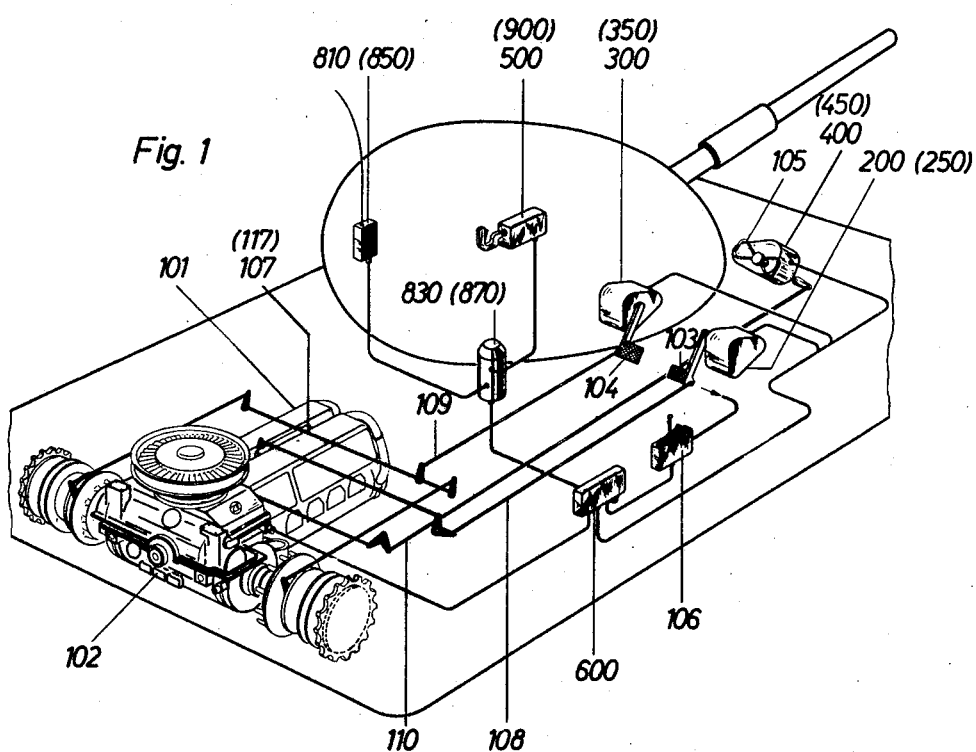
FIG. 1 illustrates in perspective the application of the invention to a military tank.

Briefly, the invention contemplates an auxiliary power means, either electric motors or hydraulic double ended power cylinders under the control of a control operator. Each such system has a disabling means whereby the vehicle driver cannot control the vehicle when such disabling means is actuated by the control operator preparatory to his assuming vehicle control. Thus in the modification wherein auxiliary electric power is used, an electromagnetic brake is initially energized which is operative to prevent mechanical manipulation of the throttle or brake pedals or the steering wheel by the driver. Each of these functions is taken over by an overriding system and each such system has an electromagnetic brake for disabling drive control at the will of the control operator. In an equivalent manner where hydraulic power is used, each overriding system has a double acting hydraulic cylinder wherein the piston is reversibly movable to mechanically operate the throttle, brakes and steering wheel of the vehicle. Each such cylinder has a bypass conduit between the chambers controlled by a valve such that when the valve is open the vehicle driver can control the function of the system by manual force, fluid being permitted to move from one chamber to the other through the open valve as the vehicle driver applies manual force to control the function of the respective hydraulic cylinder for throttle, etc. However, when the control operator wishes to assume command, the initial step is to close such valves whereby shunting of fluid between the chambers is blocked and the vehicle driver can no longer control the function of any cylinder having a blocked bypass between the chambers. Thereafter, pressure to the cylinders is controlled by the control operator to exercise command functions of any system.

The device by which the control operator exercises command is substantially the same for both modifications in that it comprises a rod having a handle and which is reciprocal in a housing at the control operator's station. The handle carries a switch which when operated by the control operator actuates the disabling means whereby the vehicle driver is powerless to control throttle, brakes or steering. Thereafter by thrusting the handle forward in the direction of motion of the vehicle the control operator can adjust the vehicle throttle. Similarly, by pulling the handle rearwardly, the control operator can apply the vehicle brakes. A particular feature of the invention resides in the fact that the natural movement of the control operator's hand for speeding up the vehicle would be in a forward direction while for slowing down the vehicle it would be in the rearward direction. The arrangement is such for both modifications that control of the throttle or vehicle brakes cannot occur simultaneously. However, by rotating the handle clockwise or counterclockwise the control operator can steer the vehicle right or left and at the same time can control the engine throttle or the vehicle brakes.

A particular advantage of the first modification of the invention utilizing electric motor auxiliary power control in steps is that no amplifier or amplifying system is required. This eliminates switching time consumed for effecting circuit stability and avoids the difficulties introduced in the event of conflict of control by the vehicle driver and the control operator both attempting to control a function at the same time. On the other hand, the second modification of the invention provides for infinitely variable control by hydraulic or auxiliary power in a relatively simple manner.

The invention is particularly well adapted so as to have correlated therein a number of control functions such as transmission control for forward, reverse, or idling condition of the transmission and wherein selection of one of these is possible only when the control handle is in a position for braking the vehicle. Further, a track type vehicle such as a tank can be steered when the transmission control is in the idling position. Moreover, the housing for the control operator's command device can also contain various push button devices for starting and stopping the vehicle engine.

The invention can also be correlated with an automatic gear shifting transmission, contemplated for use with the invention, advantageously. Thus if such transmission does not happen to be set for automatic control at the moment of overriding responsive to the control operator's will, but happens to be under manual control it will remain under manual control in the particular gear in which the transmission is at the moment. However, a torque converter is then effective whereby a speed range from stop to full speed for the gear in which the transmission is set becomes available. If the gear transmission has been set for automatic control at the time the control operator assumes command it will remain in automatic control as long as such command is exercised. The control operator may also have means carried by the control device housing such as a kickdown switch, by operation of which a shift to a higher speed can be accomplished in a known manner and speed control by throttle manipulation is effected. It is contemplated that the control operator can exercise transmission control by cable systems or the equivalent.

Referring to FIGURE 1, parenthetical numbers refer to elements of the modification of FIGS. 15–17 to be later described. The diagrammatic perspective illustrates the general layout of a military tank having the engine 101 and transmission 102. The various functions for throttle, brake and steering are effected via respective rod systems connected to pedal 103 for engine throttle control, pedal 104 for vehicle brake control and steering wheel 105 for steering the vehicle. Thus, the fuel control system comprises a fixed housing 200 which contains components for effecting overriding of driver control by a control operator wherein the pedal operates a rod system 108 which controls an injector pump 107 at the engine. Mechanical and electrical elements within housing 200 coact with switch circuitry in a fixed control box 500 mounted in the tank turret and which has a handle 521 manipulated by a control operator, such as a tank commander, so as to override actuation of the throttle control pedal 103 by the tank driver who is thereby prevented from controlling engine speed.

Similarly, a housing 300 contains components controlled by a switching arrangement within the override control box 500 so that the driver cannot operate pedal 104 which actuates the rod system 109 for the tank brakes.

Likewise, the steering wheel 105 actuation by the driver can be overridden from the control box 500 whereby actuation of the steering rod system 110 is under control of the tank commander who controls mechanism in housing 400.

It will be understood that the various cables connecting control switch circuitry in the override control box 500 with the mechanisms in the housings 200, 300 and 400 pass through a switch box which contains a portion of the circuitry. A gear shift control device 106 is part of the system. Box 600 houses a plurality of solenoid operated switches comprised in the circuit means of FIG. 8.

Further, for purposes of radio control, a transceiver 810 may be utilized which sends signals to a converter 830 whereby the various functions of the tank can be remotely controlled. Alternatively, the tank commader can utilize the transceiver for controlling other tanks.

When any driver function is taken over by the control operator, electric motor power is utilized for actuating the throttle, brake and steering rod systems and in such case the manual components, such as the pedals and the steering wheel, move under impetus of electric motors but the tank driver cannot physically overpower the electric motor forces and, accordingly, full control is effected by the control operator.

Figure 2:
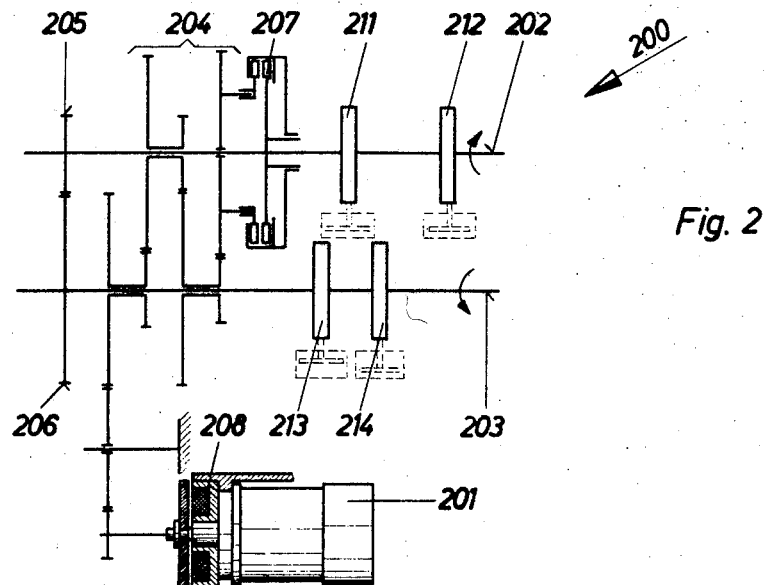
FIG. 2 shows a symbolic presentation of the cams and auxiliary power means, and electric motor together with snap action switches operated by the cams, gearing, and an electromagnetic clutch and brake, all for the purpose of operator control of the vehicle throttle.
Figure 3:
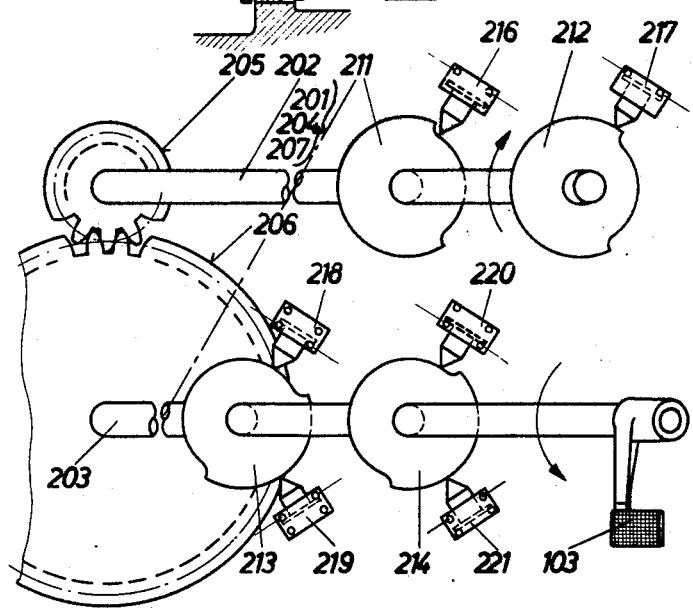
FIG. 3 shows a perspective presentation of the cams and switches symbolically presented in FIG. 2.

Referring to FIGURES 2 and 3, the circuitry and mechanism within the throttle control housing 200 is diagrammatically illustrated. The throttle pedal 103 is on a shaft 203 and an electric motor 201 is provided capable via a gear train 204 on shafts 202 and 203 of rotating shaft 202 when an electromagnetic clutch 207 is energized. Thus, all of the gears in train 204 rotate freely on shaft 202 or on the countershaft 203 and there is no driving effect on shaft 202 unless the clutch is energized. Upon energization, shaft 202 is power driven, whereupon gear 205, which is keyed to that shaft, drives the gear 206 to drive shaft 203.

Such electric motor drive for the shafts occurs at the will of the control operator at control box 500 for the purpose of throttling the fuel to the engine in various steps as accomplished by cams and switches to be described. Ordinarily, under driver control, the foot pedal 103 is depressed whereby mechanical power for operating the rod system 108 is effected by connection of such rod system directly with the pedal. On the other hand, when the shaft 203 is power operated upon energization of motor 201 via the gearing, then electric power actuates the rod system 108.

Attention is called to the electromagnetic brake 208 which is on the motor shaft and which brake when energized will prevent rotation of the motor and the gearing and shafts. Such brake energization is the very first step effected by the control operator when he wishes to take over maneuvering of the tank. By thus locking the shafts via the brake 208 and the clutch 207, the tank driver can no longer move the pedal 103. The cam and switch control arrangement will be later described.

Figure 4:
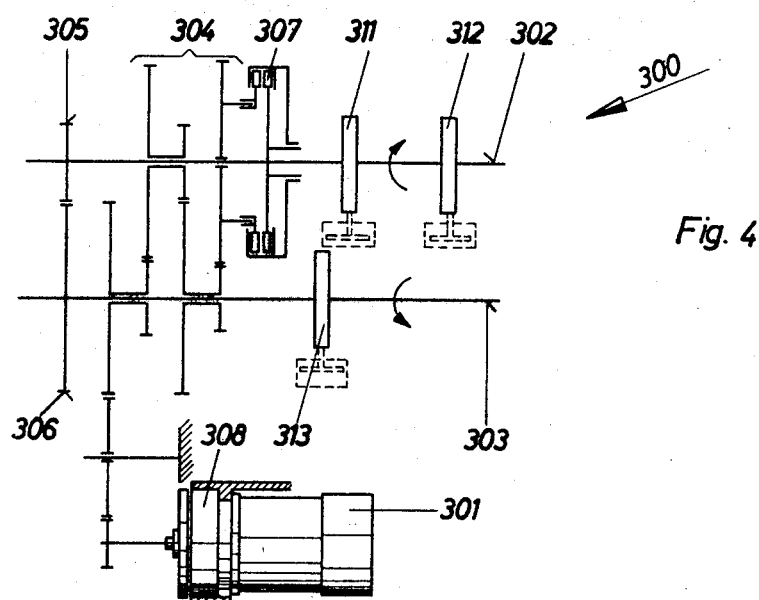
FIG. 4 illustrates an equivalent arrangement to FIG. 2 for operator control of the vehicle brakes.
Figure 5:
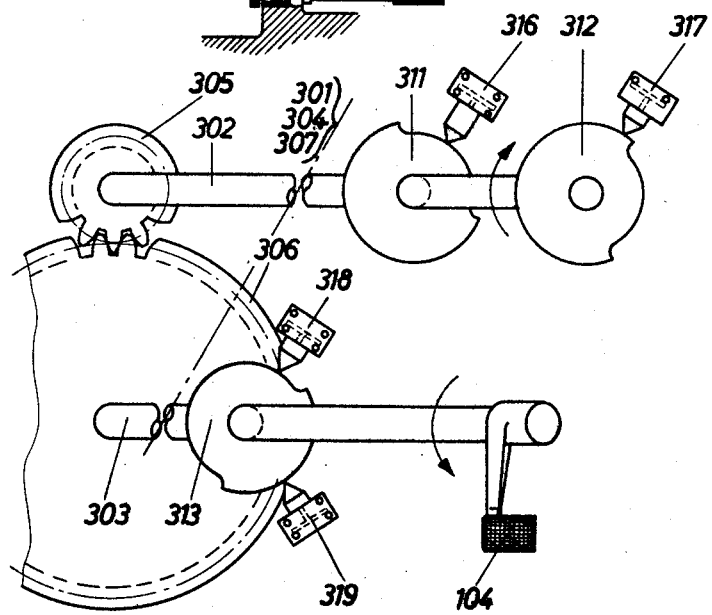
FIG. 5 is an equivalent arrangement to FIG. 3 for operator control of the vehicle brakes.

Referring to FIGURES 4 and 5 showing part of the override brake control system, a similar housing, gearing, electromagnetic brake, and electromagnetic clutch system is utilized as in FIGS. 2 and 3, wherein the shafts 302 and 303 have their counterparts in FIGURES 2 and 3, as 202 and 203. Similarly, gearing 304, 305 and 306 together with clutch 307 and electromagnetic brake 308 for motor 301 are provided. In this instance brake pedal 104 is keyed to the shaft 303. Mechanically and electrically the override brake control system is substantially identical to that described for the throttle control, except, of course, for a different arrangement of cams and switches, to be hereinafter described. All of the mechanical parts of FIGURES 4 and 5 are within the housing 300 and the control operator by suitable manipulation of the handle 521 can thus bring about braking functions, or throttling functions but not at the same time, as will be later explained.

Referring now to FIGURES 6 and 7, a portion of the steering control system, the reference numerals will be recognized as counterparts of those previously used. Thus, the housing 400 contains the elements shown in FIGURES 6 and 7 for enabling the control operator to steer the vehicle. Motor 401, shafts 402 and 403, gearing 404, 405 and 406, clutch 407 and brake 408 are provided. A steering wheel 105 is keyed to the shaft 403. In this instance the gears 405 and 406 are of equal size since this is a condition of the steering function. Conventional mechanical linkage between shaft 403 and a steering mechanism is omitted. Such linkage would vary depending upon the type of vehicle under control.

Referring to FIG. 8, certain generalizations can be made at this time. Thus, positive line 649 is connected to lines 235, 335, 435 when push button switch 501 (FIG. 11) is pressed by the control operator.

Accordingly, the circuitry is provided with current, negative line 650 being seen as permanently connected to lines 236, 336, 436.

By closure of switch 501 clutches 207, 307, 407 and electromagnetic brakes 208, 308, 408 become energized. All driver control systems are disabled and the control operator can take command of the vehicle by manipulation of handle 521 (FIG. 11).

As long as switch 501 is closed, all clutches 207, 307 407 are energized, but any brake 208, 308, 408 will be deenergized if a respective motor 201, 301, 401 is energized because the brake solenoids are in parallel with respective motor armatures. The motors are selectively energized by manipulation of handle 521, all as subsequently explained.

The diode and resistor systems 607, 617, 627 are merely for circuit stabilization.

Gear shift control 106 has been provided (FIG. 1) for the vehicle driver so that he can manually operate the gear shift or change to automatic control.

Switches 502, 503, 504 are normally open and closed for selective throttle control upon manipulation of handle 521 (FIG. 11) by the control operator. The switches effect energization of respective solenoid operated switches 601, 602, 603.

Similarly, switches 505, 506 energize respective solenoid switches 611, 612, for vehicle brake control.

Switches 507, 508, 509, 510, energize solenoid respective solenoid switches 621, 622, 623, 624, for steering control.

Electric motors 201, 301, 401 provide auxiliary power for exercise of command functions, respectively, for throttle, vehicle brakes and steering. The motors are reversible; solenoid switches 606, 616, 626 control forward rotation, respectively, and solenoid switches 605, 615, 625 control reverse direction, respectively.

THROTTLE CONTROL SYSTEM

Referring to FIGURES 2 and 3, four cams will be noted: cams 211 and 212 on shaft 202 and cams 213 and 214 on shaft 203. These cams operate respective snap action switches 216–221 as will be clear from FIGURE 3. When the vehicle is driver controlled by manual force on pedal 103, no part of the circuitry involving the switches is affected. Such circuitry is shown at the upper portion of FIGURE 8 wherein the switches just enumerated will be noted. Switch 216 is normally open, switch 217 is normally closed, switch 218 is normally open, switch 219 is normally closed, switch 220 is normally open and switch 221 is normally closed.

FIGURE 8 represents the circuitry at idling throttle conditions and it will be noted that there are switches 502, 503, and 504 for respective selection of one-third throttle, one-half throttle and full throttle, referring to throttle opening settings. Switches 502, 503 and 504 are carried in the housing 500 (FIG. 9) and the handle 521 and control rod 530 (FIG. 11) of the override control box 500 (shown in detail in FIGS. 9 through 14, to be later explained) enables the control operator to actuate any of the above switches 502, 503 and 504 to effect throttle selection.

To take over command functions, the control operator first closes push button switch 501 (FIG. 11).

At the time switch 501 is pressed, not only is the electromagnetic clutch 207 engaged but the electromagnetic brake 208 is energized to lock the shafts 202, 203, against rotation thereby blocking vehicle driver operation of the throttle pedal 103 (FIG. 1).

Subsequent to the control operator blocking or disabling the manual control system, he may select a throttle switch 502, 503, 504 depending upon the vehicle speed desired.

The stator 210 of the motor 201 has one terminal connected to the negative line 236 and the other terminal connects to the solenoid switches 605 and 606 which control, respectively, reverse and forward rotation of motor 201. The motor armature (designated with reference numeral 201) is connected across the fixed terminals of the switches 605 and 606 and the solenoid of a solenoid switch 231 is in parallel with the motor armature and is energized when the armature of the motor is energized, releasing brake 208.

Accordingly, it will be understood that when switch 501 is pressed solenoid switch 631 is energized (FIGS. 2 and 3) and the shafts 202 and 203 are locked by brake 208 against rotation in readiness to receive overriding control commands. The shafts are released when the motor armature is energized since this energizes solenoid switch 231 which interrupts the connection to brake 208. The shafts can then rotate in synchronization due to gearing 204, since clutch 207 remains energized at all times until switch 501 is released.

Such motor brake release occurs upon actuating any overriding control switch 502–504 of the throttle control system.

Assuming switch 502 for one-third throttle control is closed (via handle 521), solenoid switch 601 closes and current flows from the negative line through normally closed switch 221 and thence to the solenoid of the forward rotation switch 606, thereby closing that switch to connection with the positive line 235. In so doing, the positive line is then connected to the motor stator winding 210 as well as to the armature winding. At the same time the other terminal of the armature winding is connected to the negative line 236. The motor 201 commences to rotate in a forward direction and maintains such rotation until cam 214 revolves to the point where normally closed switch 221, which is spring biased to open, is permitted to open as the follower point of the switch drops to the reduced portion of the cam. Upon the opening of switch 221 under control of cam 214 the solenoid operated switch 606 is deenergized and the motor 201 stops rotating, leaving the throttle rod system 108 (FIG. 1) in one-third throttle position.

For half throttle or full throttle precisely the same action takes place wherein the motor is energized upon pressing respective control buttons 503 or 504 effecting energization of respective solenoid operated switches 602 and 603 and thus solenoid operated switch 606. As long as a switch 502, 503, 504 is held closed, the throttle remains at the selected opening and pedal 103 (FIG. 1) is at a specific position for the respective throttle opening.

In these latter cases the respective cams 213 and 212 revolve to the point where the respective switches 219 and 217 drop off the high dwell portions thereby opening the circuit of motor 201 after proportionally greater periods of energization.

The high dwell portions of the cams will be noted as having arcuate distances corresponding to one-third open throttle, half open throttle, and full open throttle rotation of the pedal shaft 203, it being understood that the ratio of the gearing 204 is such that the high dwell portion of full throttle cam 212 is in proper proportion to those portions of the third and half throttle cam.

It will be noted that the normally open switch 220 which effects return movement to the engine idle position of pedal 103, will be closed by the high dwell portion of cam 214 after a predetermined period of rotation of shaft 203 but prior to the opening of normally closed switch 221. The closing of idling switch 220 connects a negative line 236 to the solenoid switch 605 for reversing the motor 201 conditioning the system for return to idling condition.

In a similar manner, the circuitry operates for half throttle via the cam 213 and for full throttle via the cams 211 and 212.

Thus, the normally closed cam actuated switches 221, 219, 217 are for forward rotation of motor 210, to increase throttle opening. The motor reversing switches 220, 218, 216 control return of the pedal 103 back to idling position if the respective solenoid switch 601, 602, 603 is deenergized subsequent to a forward rotation of the motor for a throttle opening increase.

The reverse rotation from any throttle opening position of shaft 203 (and pedal 103) is effected by releasing handle 521, the throttle opening being maintained only as long as the handle is held in a selected position, as will be later apparent.

Accordingly, handle release will open switch 501, or 502, 504, 503 (whichever is held closed by handle 521), the respective solenoid 601, 602, 603 being thus deenergized, breaking the circuit to a respective switch 221, 219, 217, and making a circuit through a respective cam operated idling switch 220, 218, 216, which switch has been closed by the rotated position of the selected throttle cam. Any of the idling switches can thus become active to energize solenoid switch 605 and, therefore, effect motor current reversal.

The motor 201 reverses until the selected throttle cam permits opening of the active idling switch, which occurs at throttle idling position, at which point motor 201 is deenergized.

VEHICLE BRAKE CONTROL

To control the brake functions, switches 505 and 506 (FIGS. 4, 5) in the control box 500 are utilized. Again, the initial step is to press switch 501 (FIGS. 8, 11) to disable the manual force effect of the driver on throttle, vehicle brakes and steering; the switch 501 is retained in pressed position connecting the positive line 649 to the line 335. For partial braking of the vehicle, switch 505 is pressed via control handle 521 (FIGS. 11 and 13) to energize solenoid switch 611 whence forward rotational current is sent to motor 301 via normally closed cam operated switch 319 and solenoid operated switch 616. The current to the motor rotating in a direction to apply the brake, i.e., causing shaft 303 to rotate counterclockwise as seen in FIGURE 5, continues for a relatively short duration until the switch 319 is opened by the reduced dwell of cam 313. Switch 318 has been closed somewhat prior to this, as will be evident from comparison of the high and low cam dwell portions relative these switches. Accordingly, the current is reversed for the motor armature to bring shaft 303 back to brake release position via the reversing solenoid switch 615 after solenoid switch 611 is deenergized by opening of switch 505 upon release of handle 521 which opens switch 505.

To hold the partial braking effect, the control operator need only hold switch 501 closed; this will energize the electromagnetic brake 308 after motor 301 is deenergized because solenoid switch 331 in parallel with motor 301 is then deenergized and the circuit to brake 308 is again established.

Similarly, for full brake function, after pressing button 501, and then switch button 506, rotation of the shafts 302 and 303 ensues for a longer length of time due to the greater length of the high dwell portion of cam 312 which permits switch 317 to remain closed for full depression of pedal 104. However, switch 316 has been closed by cam 311 whence current effects closure of the reverse solenoid switch 615 to reverse the motor back to brake release position, which occurs when switch 506 is opened upon release of handle 521, deenergizing switch 612.

STEERING CONTROL

For effecting steering functions, a number of switches (FIG. 8) operable by handle 521 (FIG. 11), are provided as follows: switch 507 for a left turn on a large radius; switch 508 for a left turn on a small radius; switch 509 for a right turn on a large radius; switch 510 for a right turn on a small radius. The switches thus identified operate respective solenoid switches 621, 622, 623 and 624 which in turn are initially set to connect forward rotational current to motor 401 via solenoid switch 626.

Initially, switch 501 is pressed so that the vehicle driver cannot operate steering wheel 105 (or throttle or brakes) and with reference to FIGS. 6, 7 and 8 selection of a particular degree of steering, and direction, having been achieved by actuation of one of the switches, e.g. switch 507, rotation of motor 401 is effected via the solenoid operated switch 626 for steering to the left.

Thus, if switch 507 be actuated for a left turn on a large radius, negative terminal connection is made through the normally closed switch 422 which will be noted as being controlled by cam 415. Rotation of shaft 403 will ultimately open switch 422 previous to which the normally open switch 423 has been permitted to close by cam 415, so that at the end of traverse the motor 401 can reverse, if handle 521 is released to deenergize switch 626. The steering wheel is thus brought back to straight ahead position via current through switch 423 until that switch is opened by cam 415.

In a similar manner a large radius right turn is effected by switch 509, via switch 418 with reversal to straight ahead steering via switch 419.

Small radius right turn is effected via switch 417 operated by cam 412 and small radius left turn is effected via switch 416 operated by cam 411. The reversal switches are, respectively, switches 420 and 421, operated by cam 414.

The physical selection of turn radii switches is mechanically determined by the degree and direction of rotation of handle 521, as will be later explained.

In order to eliminate a lengthy description of all functions of the circuitry for throttle, brake and steering control, the next page presents a chart of the switch conditions for such functions.

THROTTLE OPENING

Position of switches for overriding control
(0=switch open; +=switch closed)

| Switch | Closed switch 501 (Engine idling) | 502 (1/3) | 503 (1/2) | 504 (Full) | Switch is controlled— By Cam— | For— |
|---|---|---|---|---|---|---|
| 216 | 0 | + | + | + | 211 | Idling. |
| 217 | + | + | + | 0 | 212 | Full. |
| 219 | + | + | 0 | 0 | } 213 | 1/2. |
| 218 | 0 | 0 | 0 | + |  |  |
| 220 | 0 | + | + | + | } 214 | 1/3. |
| 221 | + | 0 | 0 | 0 |  |  |

VEHICLE BRAKE

| Switch | Closed switch 501 | 505 (Partial brake) | 506 (Full brake) | Switch is controlled— By Cam— | For— |
|---|---|---|---|---|---|
| 316 | 0 | + | + | 311 | Brake released. |
| 317 | + | + | 0 | 312 | Full brake. |
| 319 | + | 0 | 0 | } 313 | Partial brake. |
| 318 | 0 | + | + |  |  |

STEERING

| Switch | Closed switch 501 | 507 Large radius left (L.) | 508 Small radius left (l.) | 509 Large radius right (R.) | 510 Small radius right (r.) | Switch is controlled— By Cam— | For— |
|---|---|---|---|---|---|---|---|
| 416 | + | + | 0 | 0 | 0 | 411 | l. |
| 417 | + | + | + | + | 0 | 412 | r. |
| 418 | 0 | 0 | 0 | 0 | + | } 413 | R. |
| 419 | + | + | + | 0 | 0 |  |  |
| 420 | 0 | 0 | 0 | + | + | } 414 | Straight ahead. |
| 421 | 0 | + | + | 0 | 0 |  |  |
| 422 | + | 0 | 0 | 0 | 0 | } 415 | L. |
| 423 | 0 | 0 | + | + | 0 |  |  |

THE CONTROL OPERATOR'S SWITCHING MECHANSM

Attention is now invited to FIGS. 9 through 14 which show details of the control operator's device for effecting overriding of the vehicle driver's manual control. Essentially, the device comprises the housing 500 which contains therein the switches 502–511 shown in FIG. 8. Certain switches are accessible on the exterior of the box 500 for separate manipulation, to be hereinafter explained.

Slidably arranged and extending into the box is a control rod 530 (FIG. 11) the exterior end of which carries handle 521 having the pivotal lever 522. Lever 522, when squeezed, actuates the switch 501 as the initial step in energizing all brakes 208, 308, 408 and clutches 207, 307, 407 in connection with the control functions as heretofore explained in conjunction with the circuitry of FIG. 8.

The handle 521 also contains a push button 525 for actuating a switch 515 and by reference to FIG. 8 it will be noted that switch 515, when pressed, energizes a solenoid operated switch 636 which is a double pole switch operative to effect automatic gear shift control for the transmission control box 700 through the circuitry arrangement 648. This provides an automatic shift to higher speed of the vehicle.

An exteriorly accessible switch 513 (FIG. 9) is utilized to start the vehicle engine while an exteriorly accessible switch 514 is utilized to stop the engine. Thus, in FIG. 8 it will be noted that the push botton 513 can energize solenoid switch 634 for routing current through line 240 to an electric started (not shown) of the engine. Similarly, when push button 154 is pressed solenoid switch 635 is energized whence current is conducted through a line 241 to a fuel control valve (not shown) for shutting off fuel to the engine fuel pump whereupon the engine stops.

Provision is made for an exteriorly operable switch handle 526 which is movable to three positions for controlling the engine at idling or for forward or reverse movement of the vehicle. This switch handle 526 is operable only when the operator control handle 521 is in position for applying the vehicle brakes and when in the idling position. Thus, referring to FIG. 10, the lever of switch 526 is keyed through a shaft to a disc 528 having a notch 529. A latch 527 is pivoted within the housing and rides on rod cam B. The latch, as shown, locks disc 528 by protruding into notch 529. However, when rod 530 is shifted to the left, cam B raises the latch so that switch 526 can be operated. The vehicle brakes are thus engaged at the time since such shifting of cam B closes switch 506 which sets full braking power of the vehicle.

Referring to FIG. 10, it will be noted that the control rod 530 carries a collar C having a plurality of grooves and has cam sections B and T of enlarged diameters. It will further be noted that the rod can be pushed forwardly in the direction of arrow F (FIG. 11) which is the direction of travel of the vehicle. Such push is against the bias of a throttle control return spring 516 disposed toward the end of the rod and partially socketed within the collar element C.

A detent pawl or pin 545 is carried by housing 500 and spring biased so as to be pressed into any of the grooves 541, 542, 543, 544, 546, and 547 so that as the rod 530 is reciprocated, it will be held easily by the control operator at any reciprocated position by pin 545 protruding into a groove. However, if the handle 521 is released, then the spring 516 has sufficient power to move rod 530 rearwardly in the opposite direction balanced by a brake control return spring 517 which has an end carried in a cup secured on the rod and another end abutting a wall of the housing. Accordingly, the rod is normally carried in a central position by virtue of the oppposite forces of the springs 516 and 517, pin 545 being then in groove 541.

Figure 9:
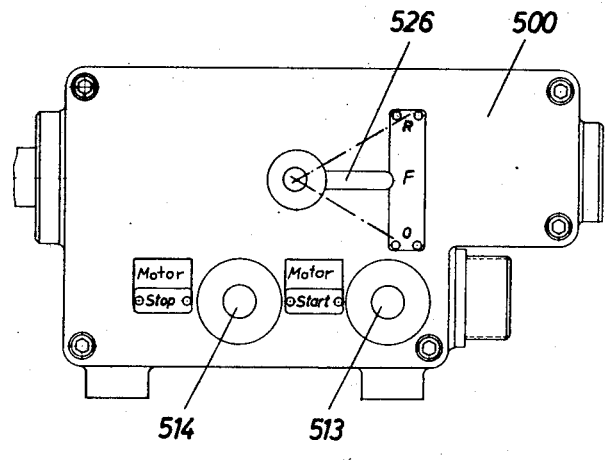
FIG. 9 is an elevation of the housing for various switches shown in FIG. 8, all of which are actuated by the control operator.

For purposes of fuel control, the switches 502, 503 and 504 are carried within the housing, as shown in FIGS. 9 and 10, such switches having pins located so as to be actuatable by the cam T in sequential order for half and full throttle. Cam B actuates switch 502 for one third throttle before cam T actuates switches 503 or 504. Such actuation is dependent on the degree of manual movement in a forward direction of handle 521. The detent holding effect for any of the throttle positions thus effected by movement of the rod is provided by the groove 542 for one-third throttle, groove 543 for one-half throttle, and groove 544 for full throttle.

Figure 13:
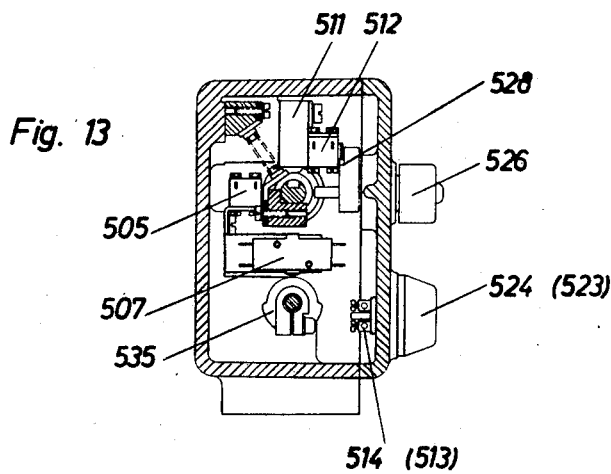
FIG. 13 is a section through XIII—XIII of FIG. 11.

When the handle is pulled rearwardly opposite the direction of movement of the vehicle, the brake control switches 505 and 506 are operable by cam B on the rod collar, the switch 505 being shown on FIG. 13 and the switch 506 being shown on FIG. 10. The brake positions of rod 530 are secured by the detent pin 545 moving into groove 546 for partial braking or into groove 547 for full braking.

From the preceding description, it will be apparent that the natural impulse of the control operator in speeding up the vehicle would be to push the control rod 530 in the forward direction of the vehicle as indicated by arrow F whence the several switches 502, 503, 504 are actuated in that order. On the other hand, the natural impulse of the control operator in slowing down the vehicle would be to pull back on the handle 521 and in which case the switches 505, 506 would be actuated in that order, providing initially partial braking and subsequently full braking.

When the control operator releases the handle, springs 516, 517, return it to a predetermined position whereat no switches are actuated by the collar, and at that time the vehicle engine is idling; pin 545 is in groove 541.

The switches for which actuation has just been described are all shown on the circuit diagram of FIG. 8, and the electrical control of functions thus effected have been heretofore explained.

Figure 14:
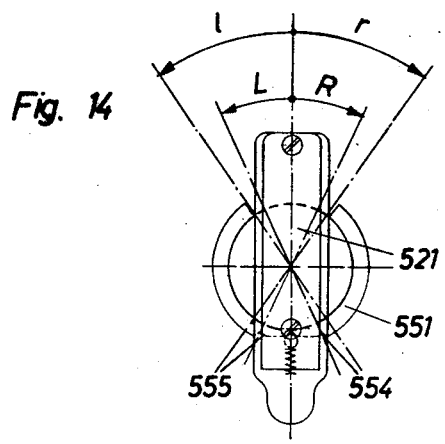
FIG. 14 is the control operator's view of the control handle in the direction XIV of FIG. 11.

For purposes of effecting an overriding steering control the handle 521 is rotated left or right, as viewed on FIG. 14, to a degree indicated by the arc R for a right turn of large radius, by the arc L for a left turn of large radius, by arc $r$ for a right turn on a small radius, and by the arc $l$ for a left turn on a small radius. It will be noted that the rod 530 has suitable bearing and sealing means as effected by the bushing S and is therefore rotative within the housing 500 upon rotation of handle 521.

Carried on the rod 530 is collar 532 having an intermediate flange extending radially therefrom and the collar is slidably keyed as by a key 531 protruding into an internal longitudinal groove of the collar and extending from rod 530, whereby rotation of rod 530 will rotate the collar 532. Further, it will be noted that rod 530 can be reciprocated with respect to the collar 532 which is axially fixed; thus, throttling and braking control can be effected simultaneously with steering control which is effected by rotation of the rod 530.

The collar 532, although rotative with rod 530, is axially fixed by means of walls of housing 500 as will be apparent from FIG. 10 wherein it will be seen that the housing 500 is open-sided and closed by a cover.

Carried on collar 532 is a gear 534 keyed to rotate with collar 532 and meshing with a gear 535 carried on a shaft 536 supported in the housing. Shaft 536 carries a plurality of cams 538, 537, 539, 540 which, upon rotation of gear 535 by gear 534, actuate respective switches 508, 507, 509 and 510. It will be noted from the circuit diagram of FIG. 8 that these switches are overriding control switches for effecting steering functions.

The sectional end view of FIG. 13 illustrates the arrangement for one of the cams, cam 537 and switch 507. It is obvious that the cam dwells, or the switch positions, can be arranged to effect actuation of a selected switch for L, R, $l$, $r$, (FIG. 14) control.

In order to maintain the handle 521 upright so that the rod 530 is in a position whereat no steering function is being effected, a torsion spring 518 (FIG. 12) is provided around collar 532, having parallel ends engaging respective sides of a fixed pin 519 carried by the housing and a pin 520 which is carried in a disc secured as by screws 562 to the radial flange of collar 532. Pin 519 passes through the flange of collar 532 and gear 534.

In neutral or straight ahead position of rod 530 the pins 519 and 520 are in the plane of the axis of rod 520 and either end of the spring 518 can be flexed depending on direction of rotation of pin 520 around the rod axis when collar 532 is rotated by the rod 530. The screws 562 also secure gear 534 to the flange of collar 532 so that the gear is rotated by rotation of shaft 530 via key 531 protruding into collar 532. Spring 518 thus provides torsional biasing to maintain shaft 530 so that handle 521 is normally vertical.

Figure 12:
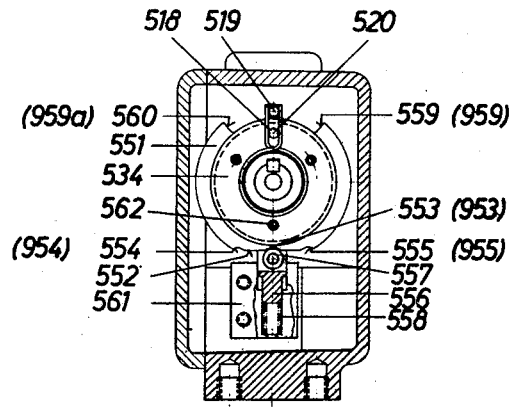
FIG. 12 is a section through XII—XII of FIG. 11.

Referring to FIG. 12, it will be noted that the disc 551 has radial stop shoulder 559 and 560 which are abuttable against the fixed pin 519 effecting a fixed limiting position of rotation of disc 551 for respective small radius turns, left ($l$) or right ($r$), as will be explained.

Limiting positions of disc 551 are not fixed for large radius turns left (L) and right (R). Thus, notches 554 and 555 are provided which are cut into the flattened lower end of disc 551, effecting a reduced radius at the lower portion. These notches coact with a spring-pressed detent roller arrangement comprising the roller 557 which normally protrudes into a notch 553 centrally located on the flattened edge of disc 551, for straight ahead steering. The roller detent is carried on a pin 556 biased upwardly by a spring 558 within a guide 561 secured to the housing.

It will be noted that the flattened edge 552 of disc 551 provides an increasing radius as the disc is rotated to effect a steering function in either direction of rotation. Accordingly, the control operator feels an increasing strain on handle 521 as he rotates it against the torsional bias of spring 518, until ultimately he can feel by the reaction against his hand when the roller 557 goes into either notch 554 or 555. At that point he can hold the handle 521 steady for a continuous turn on a fixed left or right turn large radius notch 554 for left turn and notch 555 for tight turn, cams 415 and 413 (FIG. 7), respectively, controlling the degree of turn.

If now a small radius turn is desired, the control operator continues to rotate the handle 521 which requires a further increase of manual force and such increased force is continued until the pin 519 engages a shoulder 559 or 560 depending upon the direction of turn, limiting the steering effect by the action of cams 411 and 412 (FIG. 7).

The effect of actuating the switches 507–510 to effect steering functions has already been explained in connection with the circuit diagram of FIG. 8.

Although notches 554 and 555 have a detent holding effect, spring 518 has sufficient strength in any stressed position to overcome the detent effect and thus automatically return handle 521 to vertical postion for straight ahead steering when the handle is released.

Figure 15:
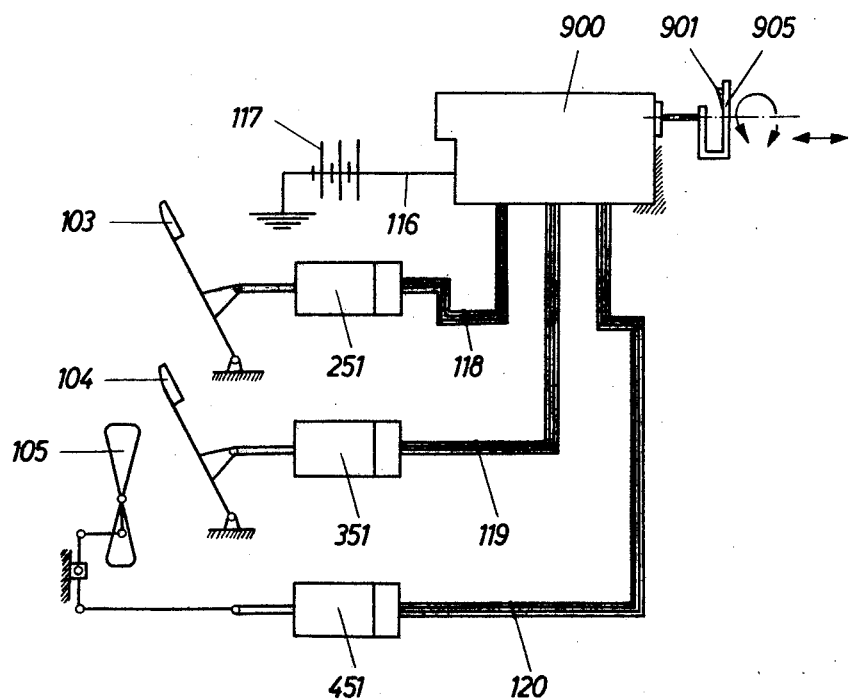
FIG. 15 is a symbolic of presentation of another modification of the invention using hydraulic power means as auxiliary power for operating the vehicle throttle, brakes and steering controls.
Figure 16:
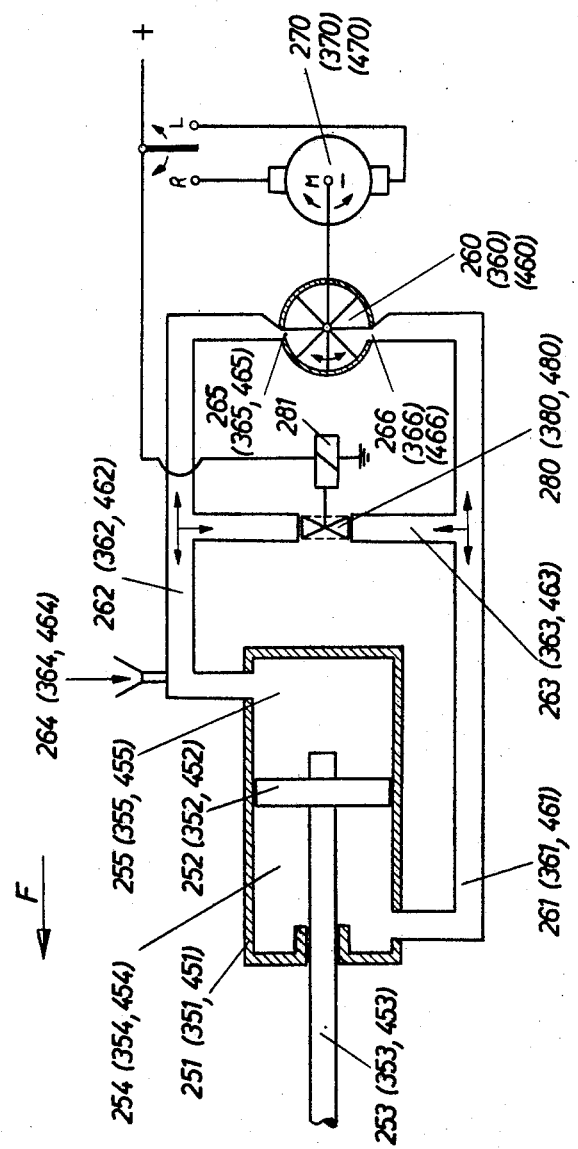
FIG. 16 is a symbolic presentation of the individual control systems for exercising control of vehicle throttle, brakes and steering and pertains to all of such functions wherein an identical system as presented in FIG. 16 is utilized.

Referring to the modification shown in FIGS. 15 and 16 and 17a, 17b, 17c, and with particular attention to FIG. 15, the throttle pedal 103 and brake pedal 104 are illustrated together with steering wheel 105, all arranged for normal operation by the vehicle driver. Also illustrated is the fixed housing 900 which contains circuitry and control switches for the control operator who manipulates the movable handle 905. It will be noted that three cables come out of the housing, each of which consists of four wires and the cables extend to auxiliary hydraulic power devices. Thus, cable 118 controls the hydraulic power device 250 having hydraulic cylinder 251, cable 119 controls the hydraulic power device 350 having the hydraulic 351 and cable 120 controls the hydraulic power device 450 having the hydraulic cylinder 451. A battery 117 provides electrical energy for the control circuitry, the positive terminal 903 going into the housing 900, negative grounded.

It will be understood that mechanical power is provided by the hydraulic cylinders 251, 351, 451 for throttle, braking, and steering actuation, respectively. By reference to FIG. 16 the symbolic diagram will be seen to illustrate one of the power systems, all of which are identical. The parenthetical numerals in FIG. 16 refer to the brake system and to the steering system.

In this instance, the hydraulic system for throttle control has a piston 252 actuating a push-pull rod 253 which will be understood to operate the throttle control rod system of FIG. 1 and, of course, an identical piston rod 353 or 453 operates, respectively, the brake and steering systems of FIG. 1.

One end of the hydraulic cylinder 251 communicates via a conduit 262 with one side of a pump 260 and the other end of the cylinder communicates via conduit 261 with the other side of pump. The connections are indicated at 265 and 266.

A conduit 263 extends between the conduits 261 and 262 and flow through into conduit 263 is controlled by a solenoid valve 280, having solenoid operator 281.

The pump 260 is driven by an electric motor 270 which is reversible. For oil filling and air venting an opening 264 has been provided.

Referring now to FIG. 17a which shows the circuitry for overriding throttle control, the positive line 903 and negative line 904 are shown, it being noted that the negative of the battery is grounded so as to form a common negative circuit for the three circuits shown. A push button switch 901, when pressed, connects the positive line to the solenoid 902 whence positive line connection will be understood to be made to all three circuits via the lines 916, 936, 946. The control operator's device has the housing 900 and handle 905 and is shown in operative position for each of the circuits although it will be understood that only one such device exists for control of the three circuits.

It will be noted that the motors 272, 372 and 472 and associated components are enclosed in a dotted rectangle and it will be understood that such motors and the associated components within the respective rectangles are housed within suitable housings, as indicated for the respective power devices 250, 350 and 450. Such housing also encompasses the solenoid operated valves 280, 380 and 480 although the pumps 260, 360, and 460 are separately housed. These valves are closed when solenoid valve 902 is closed upon the control operator pressing switch button 901.

The four wires rising vertically from each dotted rectangle will be understood to constitute a cable; thus, referring to FIG. 15 the cable 118 coming from housing 250, the cable 119 coming from housing 350, and the cable 120 coming from housing 450.

The switch 901 will be understood to be carried by the operator control handle in a manner similar to the switch 501 of FIG. 11 and when it is desired to take over vehicle control, the switch 901 is pressed which energizes, via solenoid switch 902, the solenoid 281 for valve 280 which closes off the interconnecting conduit 263. In a similar manner the valve 380 is simultaneously operated when switch 901 is closed.

Accordingly, inasmuch as the motors are not operating at this time the pump rotors are stationary and, therefore, the pistons 252, 352 are blocked against movement which they would otherwise have under control of the vehicle driver. Thus, when under driver control oil is shunted back and forth through conduits 263, 363 as the pistons are moved in response to driver operation of the throttle, vehicle brakes, since the pistons are directly connected via their respective piston rods. The vehicle driver can, however, no longer exercise any control of throttle or brake when switch 901 is closed by the control operator, as the first step in exercising vehicle control, because the shunt paths are blocked by respective valves.

Power cylinder 451 is also shunted and valve 480 can block movement of the piston but this occurs as a separate control function when the control operator takes over steering control; switch 901 does not cause blocking of cylinder 451.

THROTTLE CONTROL

Switch 901 is closed by the control operator to disable driver control of piston 252 (also 352) in the manner described.

Considering FIG. 17a the neutral position L of the handle is the idling position of the throttle and normally the handle 905 is at that position. If handle 905 is pushed in the direction of the arrow F from the neutral position L, i.e., in the forward direction of the vehicle, the switch actuating finger 911 will cause snap action switch 912 to close and connect a current via lines 916, 918, 919, 920, to the solenoid of solenoid operated switch 914. This pulls up the switch arm 922 to connect the positive line 917 via lines 924 and 925 to the switch arm and thence to line 273 to the A terminal of motor 272. Since this is a series motor, current flows through the armature of the B terminal and thence through line 274, switch arm 923, line 275 to the motor field 271 and thence to ground 276.

Accordingly, the motor is energized to drive the pump 260 in a clockwise direction, so that oil pressure flows into chamber 255 and out of chamber 254 pushing the piston in the direction of travel as indicated by arrow F. This is equivalent of depressing the throttle pedal 103 to increase the fuel supply. The action will continue as long as handle 905 is maintained in actuated position. If the movement of the handle is reversed to the position L, the finger 911 will release and fuel will feed at rate determined by how long switch 912 was depressed, it being understood that the push button 901 remains depressed so that the piston 252 is blocked against movement.

Suitable stops (not shown) can be arranged to limit maximum and minimum fuel feeds.

If fuel feed is to be decreased, then handle 905 is moved so that finger 911 closes switch 913 thereby energizing the solenoid of switch 915 via lines 903 (switch 902 closed), 916, 918, 919, switch arm 913, and line 921. The motor circuit is again closed but the polarity is reversed, in that the positive current now runs from B to A in the armature 272, connections being lines 903 (switch 902 closed), 917, 924, 925, switch arm 923 and line 274 and thence through the armature (B to A) and line 273, switch arm 922 and line 275 to the motor field 271 and ground 276.

The reversal of the motor reverses the pump 260 whence the piston 252 now moves rearwardly to raise the pedal 103.

It will be understood that any intermediate position in the course of movement of the piston can be blocked by moving the handle 905 to neutral position L and maintaining the pressed condition of the switch button 901 which, of course, is always maintained pressed when handle 905 is manipulated.

It should be noted that there is only one neutral position L for handle 905, and this is the same neutral position for the brake control functions of the handle, now to be described.

BRAKE CONTROL

Referring to FIGURE 17b, the brake control circuitry, it will be noted that the handle 905 in this instance operates in the direction of the arrow B which is the natural motion of the control operator in correlation with slowing down the vehicle, namely, pulling the handle to the rear. It will further be noted that the switches 932 and 933 for directional control of the cylinder 351 are operative from the handle position L (engine idling), moving the handle rearwardly, in contrast to the throttle control movement of the handle in the direction of the arrow F.

By providing an arrangement of handle and switches in that manner it will be apparent that throttle and brake control can be effected only individually, namely, throttle control can occur only when the brake has been released and the brake can be operated only when the engine is idling.

To effect braking function push button 901 is pressed whereby the solenoid operated switch 902 is operated to block movement of piston 352 in precisely the same manner as heretofore accomplished for the throttle system piston 252, by the closing of valve 380 upon energization of solenoid 381. Accordingly, the vehicle driver cannot operate pedal 104, or, for that matter, the throttle pedal 103 since piston 252 is also blocked.

In this case, movement of the handle 905 effects actuation of the finger 931 and assuming that the direction of the finger is rearwardly so as to close switch 933, to apply the vehicle brakes, the solenoid 934 for switch arm 942 is then energized via lines 936, 938, 939, 941, 946, and ground connection 947. Accodingly, motor 370 is energized through switch arm 942. The terminal A of the armature 372 of the motor is connected via lines 936, 937, 944, 945, switch arm 942, line 373. The terminal B is connected to ground 376 through the stator 371 via line 374, switch arm 943 and line 375. The armature and stator are thus energized in series.

Motor 370 then drives the pump 360 counter-clockwise whereby oil pressure through conduit 362 to chamber 355 moves the piston in the direction of the arrow F to apply braking force by moving the brake pedal 104, oil exhausting from chamber 354 via conduit 361 to the pump.

If handle 905 be moved forward to the position L at the time, pump 360 ceases to operate due to denergization of the motor 370, but the brake remains applied because piston 352 is blocked against movement due to the continued energization of solenoid 381 by switch 902, which maintains valve 380 closed. Such braking can be released by release of button 901.

If the control operator wishes to reduce braking effect, he merely moves handle 905 in the direction of arrow B from the neutral position to engage switch 932. Finger 931 then closes switch 932 to energize solenoid 935 via line 940 to pull up the switch arm 943. Accordingly, the motor current is now reversed through the armature 372, following the lines 936, 937, 944, 945, switch arm 943 and line 374 to terminal B. Terminal A is now connected to ground 376 through the stator winding 371 via line 373, switch arm 942 and line 375. The rotational direction of the motor and pump is now clockwise and accordingly pressure flow is now into chamber 354 and out of chamber 355 so that the piston 352 moves in a direction opposite the arrow F, thus permitting the brake pedal 104 to move in brake releasing direction via rod 353.

The control operator can move handle 905 forwardly to position L to release enegagement of switch 932 or 933 at any time in order to hold a particular braking effect, if desired, maintaining switch button 901 pressed. When braking control is no longer desired, switch 901 is released.

STEERING CONTROL

FIGURE 17c illustrates the circuit for steering control wherein it will be seen that the handle 905, if rotated counterclockwise, will cause the switch actuating finger 961 to engage the fixed stop 979 to limit a left turn; similarly, clockwise rotation of the handle will cause finger 961 to abut the fixed stop 980 to limit a right turn.

In the position shown for finger 961, switch 978 is maintained in the position shown and the motor 470 is not energized nor is the solenoid 481; valve 480 is not blocking movement of piston 452. Therefore, the vehicle driver can normally operate the steering wheel 105.

When handle 905 is rocked by the control operator for a turn, either left or right, the finger 961 releases the switch 978 which connects lines 966 and 967, thereby energizing solenoid switch 481 through lines 903, 966, switch 978 (lower terminals), line 967, solenoid 481 to ground 483. Accordingly, piston 452 is now blocked by closure of valve 480 against movement and the vehicle driver can no longer steer the vehicle.

Assuming handle 905 is continued in its arcuate motion to effect a steering function, for example, counterclockwise for a left-hand turn, the finger 961 actuates the switch 962 when current energizes the solenoid switch 964 via lines 903, 969, switch 962, line 970, to line 976 and ground 977. This energizes the armature winding 472 of motor 470. The armature is energized via lines 903, 974, 975, switch arm 972 (actuated by solenoid 964), line 474 to the armature terminal B. Armature terminal A is connected to line 473 and thense via switch arm 973, line 475, stator winding 471 and therethrough to ground 476. Accordingly, motor 470 is energized to rotate pump 460 counterclockwise and oil pressure flows through conduit 461 into chamber 454 and out of chamber 455 via conduit 462, to shift piston 452 toward the right which effects a left-hand turn by pulling on the rod 453.

It will be noted that the handle 905 may be maintained to hold switch 962 in closed position by moving finger 961 into abutment with stop 979 for as long as it is desired to maintain the turning on the smallest radius. If the control operator wishes to maintain the vehicle turning on a particular radius, he need only to move handle 905 to release switch 962 when that radius is reached, keeping the handle in a position so that it will not engage switch 978. Thus, the connection across the lower terminals of switch 978 is maintained and, accordingly, the piston 452 is prevented from movement by the vehicle operator and is, in fact, locked to hold the rod 453 in the position to which it has been actuated for the length of time that switch 962 has been held closed.

To bring the vehicle back to straight ahead position, opposite directional steering is required. If a left turn has been made, then a right turn is accomplished by rotating handle 905 to actuate switch 963, i.e., in a clockwise direction whereby finger 961 in actuating switch 963 will close the terminals connecting lines 971 and 968. Solenoid 964 is, of course, deenergized by release of switch 962 and the actuation of switch 963 then energizes the switch 973 via the solenoid 965. Accordingly, current is reversed through the armature 472 which reverses the rotation of the pump and moves piston 452 to the left to effect turning the vehicle toward the right. When the vehicle starts moving in a straight line, after the left turn has been thus compensated, the control operator can then move handle 905 away from switch 963 but not up to switch 978 so that he can continue to exercise the overriding function, if he wishes. If, of course, he wishes to continue the right turn he may do so, down to the smallest radius determined by the engagement of finger 961 with stop 980. On the other hand, if he wishes straight ahead steering, he can move the handle to the vertical position whereat the vehicle driver can steer.

In the description of the preceding modification of FIGS. 15–17a, 17b, 17c, it will be understood that the showing of the actuating means 900, 905, etc. is merely symbolic and, particularly, the showing of switch actuating fingers will be understood to be only for illustrative purposes and ease of presentation of the featured subject matter. Thus, the featured subject matter is the use of hydraulic power systems for continuous actuation of throttle, brakes and steering devices of a vehicle such that any selected position of such devices can be achieved within the range provided by the mechanisms involved, e.g. the limit of movement of the pistons, or the brake linkage, etc.

As a practical matter, the actuating means for switches 912, 913, 932, 933, 963, 978, 962 would be essentially the same as shown in FIGS. 9 through 14 of the first modification of the invention, wherein a rotative and reciprocal control rod 530 and coacting mechanisms such as switch actuating cams and detent grooves are utilized.

It follows that the neutral position L of FIGS. 17a and 17b merely represents the position of the control rod 530 (FIG. 11) when pin 545 is in neutral groove 541. Thus, the switches 912 and 932 would be forwardly disposed of the neutral position L and the switches 913 and 933 would be rearwardly disposed, with reference to the direction of travel of the vehicle.

To illustrate the parallelism of the mechanical control arrangements for the two modifications, the following may be noted:

Notch 953 in FIG. 12 indicates the straight ahead steering position for the hydraulic power arrangement of FIG. 17c and this would correspond to the same notch 553 of the electric motor powered arrangement. Thus, in FIGURE 17c the switch 978 would be open and, therefore, the valve 480 would be open; cylinder chambers 454 and 455 receiving no fuel pressure, and the driver has control.

Notch 954 in FIG. 12 indicates for the hydraulic power arrangement the same notch 554 of the electric power arrangement, a detent for large radius left-hand steering. In such case switch 978 of FIG. 17c is closed and valve 480 is energized to block shunting of fluid between the chambers of cylinder 451. However, no steering effect is achieved as yet, this being merely the intermediate position before switch 962 is closed.

Shoulder 959 limits the rotation of the control rod for a lefthand turn, switch 962 now being closed whereby solenoid switch 972 is energized and pressure fluid is fed to cylinder 451, such pressure feeding continuing at the will of the control operator. If desired, the handle 905 is moved back to effect a reengagement of notch 554. This holds the vehicle in a steering maneuver on a radius selected depending on how long switch 962 was held closed.

Shoulder 959a provides the opposite effect in that it limits rotation of handle 905 at the point where switch 963 is closed whence cylinder 451 receives reverse feed and thereby effects a righthand turn.

From the above, it will be recognized that the notch 955 corresponds to the notch 954 except for being in an intermediate position in preparing to make a right turn, and that the shoulders 959 and 959a correspond to the symbolic stops 979 and 980 of FIG. 17c.

What is claimed is:

1. In a dual control arrangement for vehicles, a plurality of manually operable control devices for normal vehicle control by a driver, overriding control means for use of a control operator comprising a disabling means for locking said manually operable devices against movement by said control operator so that the vehicle driver is unable to effect manual control thereof; and said overriding control means also comprising systems for use by said control operator for selectively actuating said manually operable devices by auxiliary power subsequent to operation of said disabling means.

2. In a dual control arrangement, as set forth in claim 1, said overriding control means comprising an electric motor for each of said manually operable devices and coupling means for coupling respectively thereto; and selective switch means for energizing said motors selectively for selective periods of time to operate respective devices, wherein the period of operation determines the degree to which any device is operated.

3. In a dual control arrangement, as set forth in claim 1, said overriding control means comprising an electric motor for each of said manually operable devices, and selective means for energizing said motors selectively for selective periods of time to operate said devices, wherein the period of operation determines the degree to which any device is operated, said disabling means comprising an electromagnetic brake energizable at the will of the control operator for locking against manual operation of said devices, including switch means whereby energization of a specific motor deenergizes the respective electromagnetic brake.

4. In a dual control arrangement as set forth in claim 1, wherein said manually operable control devices each comprises a mechanically movable member wherein one device controls engine throttle, a second device controls vehicle brakes, and a third device controls vehicle steering; said overriding control means having a member movable by a control operator in the direction of forward vehicle movement for effecting overriding throttle control; and said member being movable in a direction opposite to vehicle movement for effecting vehicle brake control; and elements associated with said member whereby throttle control or brake control can be exercised individually wherein simultaneous control is prevented.

5. In a dual control arrangement for vehicles as set forth in claim 1, wherein said manually operable control devices each comprises a mechanically movable member wherein one device controls engine throttle, a second device controls vehicle brakes, and a third device controls vehicle steering; said overriding control means having a member reciprocal by said control operator in the direction of forward vehicle movement for effecting overriding throttle control; and said member being reciprocal in a direction opposite to vehicle movement for effecting brake control; elements associated with said member whereby throttle control or brake control is exercised individually and simultaneous control is prevented; said member having means for reciprocal movement, spring means for maintaining said member in a neutral position whereat no overriding control of throttle or vehicle brakes is exercised; said member being rotatively mounted for reversible rotative movement for steering control; and elements associated with said member to maintain it in a neutral position for straight ahead steering and permitting rotation of said member in reciprocated positions thereof whereby a vehicle can be afforded either throttle or brake control simultaneously with steering control.

6. In a dual control arrangement for vehicles as set forth in claim 1, said overriding control means comprising a manually movable member (530), means whereby said member is mounted for manual movement to selected positions, a plurality of switches actuatable by said member in respective positions, circuitry means comprising electric motors controlled by actuation of said switches for effecting auxiliary power for operating said control devices, means operated by respective motors for limiting the time of operation of each of said motors to thus limit the extent of overriding control operation of respective control devices.

7. In a dual control arrangement as set forth in claim 6, said disabling means comprising a switch actuatable by said control operator, an electromagnetic brake for each of said devices whereby actuation of said latter switch prevents operation of said devices by said driver, and circuitry means whereby energization of any motor deenergizes a respective electromagnetic brake.

8. In a dual control arrangement for vehicles as set forth in claim 1, said manually operable control devices comprising a plurality of elements (103, 104, 105) physically operable by said vehicle driver and each of said elements being connected to a respective shaft (203, 303, 403) comprised in said overriding control means systems, said overriding control means systems further comprising a shaft adjacent a respective first-mentioned shaft, gears carried by said shafts and meshing with each other in each system, cams carried by said shafts, switches disposed adjacent respective cams and operative thereby upon rotation of said shafts; each said system comprising an electric motor disposed to be coupled to rotate one of said shafts in the respective system whereby the other of said shafts is rotated, an electromagnetic clutch in each system for coupling each motor to said one shaft in each system, means operable by the control operator for energizing a selected electromagnetic clutch whereby each motor is operable to effect rotation of respective shafts; a manually operable means comprising switch means for effecting selection of energization of the motor in each said system, and circuitry means for all said switches whereby rotation of the shaft operative to actuate the respective manually operable control device in any system continues for a time determined by cam actuation of the cam actuated switches in that system.

9. In a dual control arrangement for vehicles as set forth in claim 1, each said system comprising a double chamber hydraulic cylinder and having a double acting piston connected to a respective manually operable control device; said disabling means comprising a plurality of elements operative in each system to permit shunting of fluid back and forth between the two chambers of each of said cylinders when said devices are driver controlled and also being operative to block shunting of fluid at the will of a control operator; and means in each system for providing fluid pressure selectively to the chambers of the cylinder in each system at the will of a control operator when shunting of fluid between the chambers of that cylinder is blocked and for a period of time determined by the control operator.

10. In a dual control arrangement for vehicles as set forth in claim 9, said plurality of elements comprising a respective conduit in each system connecting the two chambers of the respective cylinder and a respective valve controlling flow in said conduit.

11. In a dual control arrangement for vehicles as set forth in claim 10, each said valve being solenoid operated, said means for providing fluid pressure comprising an electric motor and a pump in each system; and circuitry means selectively controllable by a control operator for selectively energizing said solenoids to block shunting of fluid between the chambers of any cylinder, and said circuitry means being operative to subsequently energize a selected motor.

12. In a dual control arrangement for vehicles as set forth in claim 11, said circuitry means comprising a pair of spaced switches for each said system, a movable switch actuating means for each pair of switches for selective actuation thereof by a control operator; each said motor being reversible in direction dependent upon actuation of a selected switch of each pair of switches whereby pressure feed from said pump is operative to reversibly actuate the device of each system.

13. In a dual control arrangement for vehicles as set forth in claim 12, a first pair of said switches being for throttle control and a second pair of said switches for brake control; the switches of said first and second pairs being disposed so that actuation of said first pair occurs when said handle means is disposed forwardly relative to the direction of travel of a vehicle and with respect to a neutral position of said handle means, and actuation of said second pair occurs when said handle means is disposed rearwardly of said neutral position.

14. In a dual control arrangement for vehicles as set forth in claim 13, said circuitry means including a third pair of switches and actuating means for selective actuation thereof and being reversibly pivotable for actuation of a selected switch of said third pair; and circuitry means conditioned responsive to actuation of a switch of said third pair; hydraulic power means controlled by said circuitry means for operating a steering device of a vehicle in a direction responsive to actuation of a respective switch of said pair of switches.

15. In a dual control arrangement for vehicles as set forth in claim 14, including an additional switch intermediate said third pair of switches and actuatable by said actuating means and being connected to said circuitry means and operative initially to permit driver controlled steering, wherein one of said elements is a solenoid operated valve for blocking said flow when energized; said third switch being actuated upon disengagement of said actuating means to effect energization of said solenoid operated valve to block driver control of said steering device.

16. In a dual control arrangement for vehicles as set forth in claim 15, said circuitry means including a third pair of switches operable by said handle means for selective actuation thereof and said handle means being reversibly pivotable for actuation of a selected switch of said third pair; and circuitry means conditioned responsive to actuation of a switch of said third pair; hydraulic power means controlled by said circuitry means for operating a steering device of a vehicle in a direction responsive to actuation of a respective switch of said pair of switches.

17. In a dual control arrangement for vehicles as set forth in claim 16, including an additional switch intermediate said third pair of switches and actuatable by said handle means and being connected to said circuitry means and operative initially to permit driver controlled steering, wherein one of said elements is a solenoid operated valve for blocking said flow when energized; said third switch being actuated upon disengagement of said handle means to effect energization of said solenoid operated valve to block driver control of said steering device.

18. In a dual control arrangement for vehicles as set forth in claim 1, said overriding control means comprising a movable member carrying a cam (B), a plurality of brake control switches operable by said cam upon movement of said member, one said system comprising means for applying vehicle brakes responsive to operation of said switches; a housing supporting said movable member and said switches; a transmission control switch (526) carried by said housing and means controlled thereby for effecting transmission control; a latch means (527) locking said transmission control switch and releasable by said cam when said cam is in position to operate said brake control switches.

19. In a dual control arrangement for vehicles as set forth in claim 1, said overriding control means comprising a housing having a movable member, means responsive to movement of said member to control said systems, and a switch (515) carried by said housing operative to effect speed control of a vehicle transmission.

20. In a dual control arrangement for vehicles as set forth in claim 19, and switches (513, 514) carried by said housing for effecting starting and stopping of a vehicle engine.

21. In a dual control arrangement for vehicles, a plurality of manually operable control devices for normal vehicle control by a driver, overriding control means for use of a control operator comprising a disabling means for disabling said manually operable devices by said control operator so that the vehicle driver is unable to effect manual control thereof; and said overriding control means also comprising systems for use by said control operator for actuating said manually operable devices by auxiliary power subsequent to operation of said disabling means, wherein said manually operable control devices each comprises a mechanically movable member wherein one devices controls engine throttle, a second device controls vehicle brakes, and a third device controls vehicle steering; said overriding control means having a member (530) reciprocal by said control operator in the direction of forward vehicle movement for effecting overriding throttle control; and said member being reciprocal in a direction opposite to vehicle movement for effecting brake control; elements associated with said member whereby throttle control or brake control is exercises individually and simultaneous control is prevented; said member having means for reciprocal movement, spring means for maintaining said member in a neutral position whereat no overriding control of throttle or vehicle brakes is exercised; said member being rotatively mounted for reversible rotative movement for steering control; and elements associated with said member to maintain it in a neutral position for straight ahead steering and permitting rotation of said member in reciprocated positions thereof whereby a vehicle can be afforded either throttle or brake control simultaneously with steering control, said member having cam means; and a plurality of switches radially and axially spaced relative to said member whereby reciprocal movement of said member to a predetermined extent is operative to actuate a selected switch by said cam means; circuitry means associated with said switches and controlled thereby for effecting engine throttle and vehicle brake control by operation of said first and second devices, respectively; said member having a plurality of grooves, a detent paw biased to move into individual grooves as said member is reciprocated to hold said member in a position whereat a selected switch is maintained in actuated condition.

22. In a dual control arrangement for vehicles as set forth in claim 21, said member having a handle and said disabling means comprising a switch carried by said handle; a plurality of switches fixedly disposed in relation to said member and actuatable by said member in respective reciprocated positions thereof and circuitry means comprising all said switches for controlling said one device to control engine throttle and said second device to control vehicle brakes.

23. In a dual control arrangement for vehicles as set forth in claim 21, wherein said last-named elements comprise a housing (500), means (531, 532) providing slidable movement of said member (530) with respect to said housing; a motion limiting disc (551) rotational with said member and having a pair of angularly spaced shoulders (559, 560); a stop pin (519) carried by said housing, one shoulder or the other being abuttable with said pin to limit rotation of said member in a respective direction, a torsion spring (518) encompassing said member, a pin (520) rotational with said member, said torsion spring having ends initially engaging respective sides of both of said pins when said pins are in alignment with the axis of said member whereby rotation of said member can flex either end of said torsion spring depending upon direction of rotation and the other end then has reaction support against said fixed pin (519), whereby after rotational force is manually exerted on said member said torsion spring effects a predetermined neutral position therefor upon release of said manual force.

24. In a dual control arrangement for vehicles as set forth in claim 23, said motion limiting disc (551) having a detent portion (552) of varying radii and a pair of detent notches (554, 555) disposed on said portion; a detent member (556) and means biasing said detent member against said portion whereby said detent member can engage in either of said notches depending on direction of rotation of said member (530) to effect a partial holding force against the torsional stress in said torsion spring (518) when said member (530) is in a rotated position and whereby rotation of said member is against an increasing reaction of said torsion spring by virtue of said detent portion being pressed by said detent pawl; said torsion spring being of sufficient force when under stress to overcome the holding force of said detent notches when no manual rotational force is being exerted on said member.

25. In a dual control arrangement for vehicles as set forth in claim 24, wherein said notches are on opposite sides of said detent pawl (556) when said member (530) is in non-rotated neutral position so as to feelably indicate upon rotation by said control operator a predetermined steering radius when said pawl member engages a notch; and said shoulders (559, 560) are disposed in positions such that abutment with said fixed pin (519) occurs when rotation of said member (530) has been increased beyond the points of engagement of said detent member (556) with either of said notches, depending upon direction of rotation of said member (530), for limiting minimum turn radii, and a third notch (553) on said detent portion intermediate said pair of notches to receive said pawl for a neutral position of said member (530).

26. In a dual control arrangement for vehicles as set forth in claim 21, a plurality of switches fixedly disposed with respect to said member and means operative by rotation of said member in either direction for actuating at least one switch depending upon direction of rotation, and circuitry means connecting said switches with said third control device for effecting vehicle steering.

27. In a dual control arrangement for vehicles as set forth in claim 21, said grooves being axially divided into two groups and a neutral position groove (541) intermediate said groups for receiving said detent pawl (545) to hold said member in a neutral position between said groups, wherein one group is disposed forwardly relative to the direction of travel of said vehicle for throttle control positions of said member and the other group is disposed rearwardly for braking positions of said member, said neutral groove effecting an idling position of said member.

References Cited

UNITED STATES PATENTS

| | | | |
|---|---|---|---|
| 1,880,138 | 9/1932 | Hubl | 180—6.70 X |
| 2,328,606 | 9/1943 | Boldt | 180—6.2 X |
| 3,078,942 | 2/1963 | Wiebe | 180—79.1 X |
| 3,117,649 | 1/1964 | Parton. | |
| 3,363,708 | 1/1968 | Engberg | 180—6.2 |

LEO FRIAGLIA, Primary Examiner

JOHN A. PEKAR, Assistant Examiner